United States Patent [19]

Lerch et al.

[11] 4,223,355

[45] Sep. 16, 1980

[54] TELEVISION CAMERA

[75] Inventors: Joachim Lerch, Leopoldshafen; Gerhard Seitz, Karlsruhe, both of Fed. Rep. of Germany

[73] Assignee: Siemens Aktiengesellschaft, Munich, Fed. Rep. of Germany

[21] Appl. No.: 935,102

[22] Filed: Aug. 21, 1978

[30] Foreign Application Priority Data

Aug. 29, 1977 [DE] Fed. Rep. of Germany ....... 2738852

[51] Int. Cl.² .............................................. H04N 5/30
[52] U.S. Cl. .................................... 358/248; 335/214; 358/229
[58] Field of Search ................ 358/248, 229; 335/214

[56] References Cited

U.S. PATENT DOCUMENTS

| 3,052,809 | 9/1962 | Bähring | 335/214 |
| 4,145,678 | 3/1979 | Takikawa | 335/214 |

Primary Examiner—Howard W. Britton
Attorney, Agent, or Firm—Kenyon & Kenyon

[57] ABSTRACT

A deflection system for television cameras with a focusing coil surrounded by a magnetic shielding cylinder in which the outside diameter of the focusing coil is approximately equal to the inside diameter of the magnetic shielding cylinder and the focusing coil and the magnetic shielding cylinder are connected to each other in a heat conducting manner.

10 Claims, 1 Drawing Figure

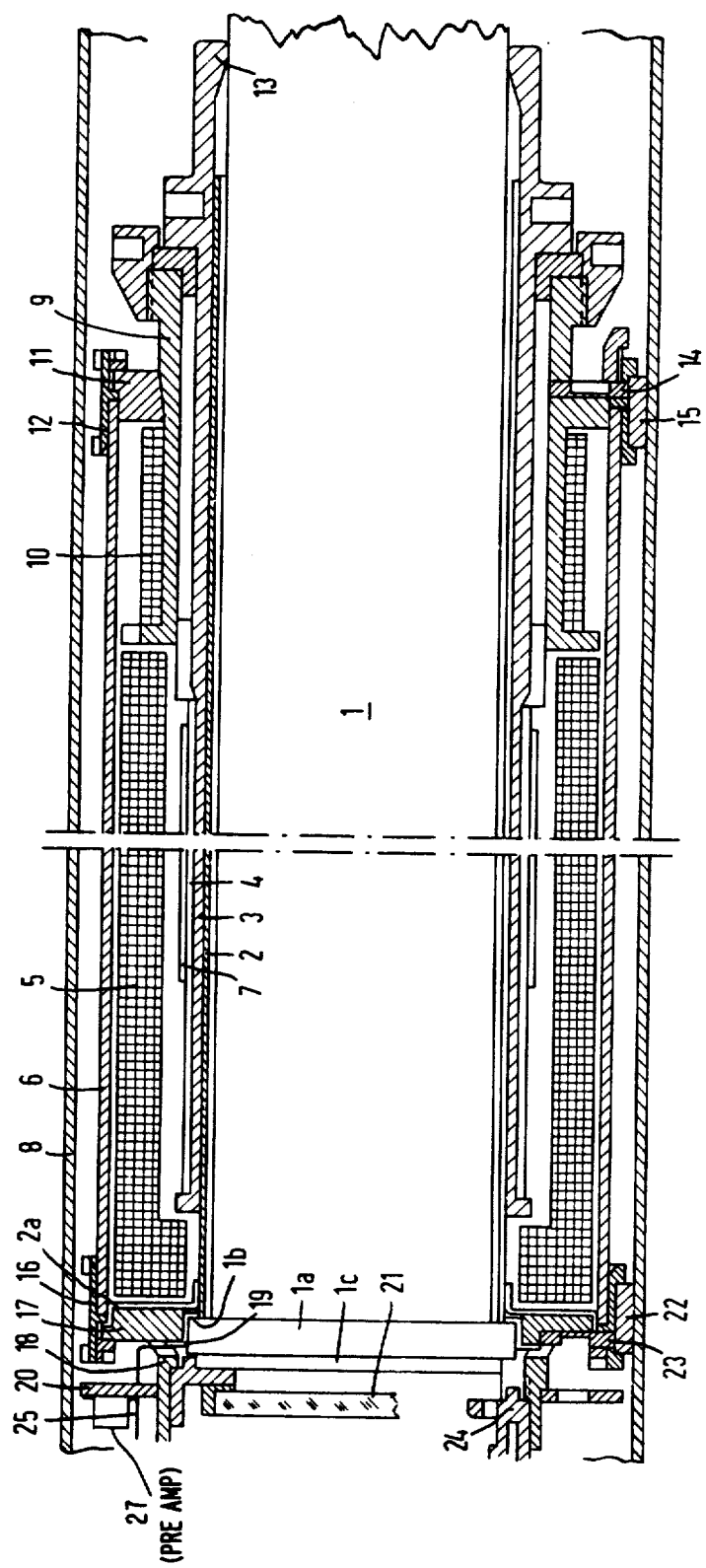

TELEVISION CAMERA

BACKGROUND OF THE INVENTION

This invention relates to a television camera with a pickup tube of the vidicon type, deflection coils which surround the tube, over which a focusing coil is arranged, and with a cylinder enclosing the coils for magnetic shielding.

Several deflection and focusing systems for television cameras are known, for instance, from U.S. Pat. No. 3,919,586 and 3,774,070, in which the deflection and focusing coils are each wound on a coil form. The coil form for the focusing coil, which can be surrounded by a shielding cylinder on mu metal, is pushed over the deflection coils. In this arrangement, the supporting parts for holding the tube are the coil forms. As a result, the heat generated in the coils is removed inward toward the coil form, especially since in such designs there is, as a rule, an air gap between the focusing coil, which generates most of the heat, and the shielding cylinder.

SUMMARY OF THE INVENTION

It is an object of the present invention to provide a television camera which is distinguished by good removal of heat from the coil system and by compact design.

According to the invention, this problem is solved by making the outside diameter of the focusing coil approximately equal to the inside diameter of the shielding cylinder and connecting the shielding cylinder and focusing coil in a heat conducting manner.

In such an arrangement, the heat generated in the focusing coil is removed outwardly to the magnetic shielding cylinder, which in turn can be cooled by heat sinks. The removal of the heat to the outside can be improved by insulating the focusing coil on its inside with an air cushion which is situated between the focusing coil and the deflection coils. The focusing coil is advantageously wound in a self-supporting manner.

The heat removal from the coil system can be further improved by expanding a metallic cylinder serving for electrostatic shielding, which is located between the pickup tube and the deflection coils, at one end in the manner of a flange which is brought into thermal and electrical contact with the magnetic shielding cylinder or an external sleeve. Thereby, the heat generated by the deflection coils and the remaining heat of the focusing coil penetrating inward toward the tube are also removed to the outside. If the focusing coil is made larger at its front end, located near the pickup plate, so that the number of turns per centimeter is increased there, then the flange and the focusing coil are advantageously arranged so that they rest against each other, so that the heat generated in the enlarged part of the focusing coil is removed quickly.

BRIEF DESCRIPTION OF THE DRAWING

The single FIGURE is a cross sectional view of a television pickup tube according to the present invention.

DETAILED DESCRIPTION OF THE INVENTION

A television pickup tube 1 of the vidicon type with a signal electrode ring 1a and a face plate 1c, which carries the signal plate, is surrounded by a metallic cylinder 2, which is expanded into a flange 2a at its forward end which faces the face plate 1c of the pickup tube. The cylinder 2 is made in the form of a conductor clad flexible circuit board. Longitudinal slots are etched in the cladding in such a manner that the cylinder 2 has lengthwise metallic strips which are electrically connected to each other only at the outer rim of the flange 2a.

A carrier 3 for the deflection coils 4 is mounted at the outside of the cylinder 2. They, too, are advantageously etched on a flexible circuit board. A coil 7 for dynamic focusing surrounds the deflection coils 4. The coil carrier 3 is made thicker at its rear end which faces the base of the tube 1 and ends in clamps 13, into which the tube 1 is clamped in the vicinity of its base. In its rearward zone, the coil carrier 3 carries a cylindrical member 9 into which centering coils 10 are placed and which also has a ring 11, on which the one end of a cylinder 6 is mounted. The cylinder 6 is used for magnetic shielding and is therefore advantageously made of mu metal. At the other end of the magnetic shielding cylinder a ring 17 which is connected to the face plate 1c of the pickup tube is mounted. Toward the front, the ring 17 is expanded into a cylinder 18 and is drawn against the face plate 1c by means of a screw 24, so that it is firmly seated thereon. On its inside it carries a contact ring 19 which makes contact with the signal electrode 1b of the pickup tube and from which a line 25 leads to a ring shaped circuit board 20, onto which a preamplifier 27 is soldered.

The pickup tube 1 is therefore supported in the region of the signal plate and the base; the mounting rings are connected to each other by the shielding cylinder 6 which forms a stable mechanical and, also, a stable electrical connection so that it, and not a coil form is the support element for the pickup tube. At both its ends, rings 12 and 16 are fastened, for instance, by soldering, which are aligned with each other and are clamped against an outer guide sleeve 8 by means of three projections each which are provided on a band, of which the projections 15 and 22, are visible, by letting spiral washers 14 and 23, which are recessed, into the rings 11 and 17, push the projections outward.

A coil 5 is inserted into the shielding cylinder 6 for static focusing. The heat generated in the coil 5 flows through a heat conducting connection to the cylinder 6, on which a heat sink may be placed if required. In the illustrated embodiment, the focusing coil 5, which is wound to be self-supporting, is cemented into the shielding cylinder 6 by means of a heat conducting adhesive. Between the focusing coil 5 and the deflection coils 4 and the dynamic focusing coil 7, respectively, a space is provided. This forms an air cushion which prevents heat from getting from the focusing coil 5 inward to the tube 1. For better focusing of the electron beam in the tube 1, the coil 5 is enlarged at its forward end in the vicinity of the face plate 1c, so that a larger number of turns per centimeter is obtained there. The heat generated there is additionally removed due to the fact that the focusing coil 5 rests against the flange 2a, so that the heat flows to the shielding cylinder 6 via the flange 2a and is likewise discharged to the outside. The heat generated in the deflection coils 4 is likewise conducted from the electrostatic shielding cylinder 2 to the magnetic shielding cylinder 6.

What is claimed is:
1. In a television camera including:

(a) a pickup tube of the vidicon type with deflection coils surrounding the tube;
(b) a focusing coil, wound in self-supporting manner, disposed thereover;
(c) a cylinder enclosing the coils for magnetic shielding, the improvement comprising:
(d) the outside diameter of the focusing coil being approximately equal to the inside diameter of the magnetic shielding cylinder; and
(e) a conductive adhesive connecting the focusing coil to the shielding cylinder in a heat conducting manner.

2. The improvement according to claim 1, and further including an air gap between the deflection coils and the focusing coil.

3. The improvement according to claim 1, wherein said pickup tube is supported within said cylinder by means of first and second spaced rings.

4. The improvement according to claim 1, wherein said vidicon tube includes a disc carrying a signal plate and further including a mounting ring in which the tube is held in the vicinity of the disc carrying the signal plate, disposed at the end of the magnetic shielding cylinder on the signal plate side.

5. The improvement according to claim 4, wherein said tube includes a signal electrode ring and wherein a contact ring, which makes contact with the signal electrode ring is arranged at the inner rim of the mounting ring and a preamplifier to which said contact ring is electrically connected.

6. The improvement according to claim 5, wherein said preamplifier is disposed on a disc which is arranged in front of said mounting ring concentrically thereto.

7. The improvement according to claim 6, and further including a second mounting ring fastened in the end of the magnetic shielding cylinder facing the tube base and a cylindrical member holding the pickup tube, said second mounting ring secured to said cylindrical member.

8. The improvement according to claim 1 and further including a shielding cylinder for electrostatic shielding disposed between the tube and the focusing coil, said shielding cylinder expanded at its end facing the signal plate of the tube in the manner of flange contacting said magnetic shielding cylinder, the end face of the focusing coil resting against said flange on the signal plate side.

9. The improvement according to claim 8, wherein said electrostatic shielding cylinder is made of a flexible clad circuit board in which lengthwise slots are etched in such a manner that the shielding cylinder has metallic strips extending in the axial direction, said strips electrically connected to each other via said flange.

10. The improvement according to claim 1 and further including a guide tube placed over said magnetic shielding cylinder, a ring with a slot along its circumference disposed on each of the two ends of said magnetic shielding cylinder, a band having three projections placed into each of said rings, the spacing of said projections chosen so that, with the band in place, they are ditributed approximately uniformly over the circumference, and a spiral washer disposed under the middle projection through rotation of which the projections are pushed against the inside wall of said guide tube.

* * * * *